United States Patent [19]
Kim

[11] Patent Number: 5,978,512
[45] Date of Patent: Nov. 2, 1999

[54] POLYGONAL APPROXIMATION METHOD AND APPARATUS FOR USE IN A CONTOUR ENCODING SYSTEM

[75] Inventor: Jin-Hun Kim, Seoul, Rep. of Korea

[73] Assignee: Daewoo Electronics Co., Ltd, Seoul, Rep. of Korea

[21] Appl. No.: 09/124,032

[22] Filed: Jul. 29, 1998

Related U.S. Application Data

[63] Continuation-in-part of application No. 08/819,842, Mar. 17, 1997, abandoned.

[30] Foreign Application Priority Data

Jan. 21, 1997 [KR] Rep. of Korea ......................... 97-1561

[51] Int. Cl.$^6$ ................................. G06K 9/36; G06K 9/48
[52] U.S. Cl. ........................... 382/241; 382/199; 382/205; 382/242; 345/443
[58] Field of Search ................................... 382/199, 200, 382/241, 243, 263, 266, 203, 286, 288, 289, 205; 345/16, 17, 26, 144, 442, 443, 470, 441

[56] References Cited

U.S. PATENT DOCUMENTS

| | | | |
|---|---|---|---|
| 5,214,754 | 5/1993 | Okamoto et al. | 345/442 |
| 5,335,298 | 8/1994 | Hevenor et al. | 382/199 |
| 5,384,905 | 1/1995 | Tanaka et al. | 395/143 |
| 5,471,574 | 11/1995 | Prasad | 345/442 |
| 5,617,487 | 4/1997 | Yoneyama et al. | 382/199 |
| 5,691,769 | 11/1997 | Kim | 348/403 |
| 5,694,331 | 12/1997 | Yamamoto et al. | 364/512 A |

FOREIGN PATENT DOCUMENTS

| | | | |
|---|---|---|---|
| 2114851 | 8/1983 | United Kingdom | H04N 1/41 |
| 2203613 | 10/1988 | United Kingdom | H04N 1/411 |

OTHER PUBLICATIONS

"Scan Converting Circles" p. 83 of Computer Graphics: Principles and Practice 2nd Edition, The Systems Programming Series by James D. Foley—Library of Congress Cataloging–in–Publication Data.

*Primary Examiner*—Amelia Au
*Assistant Examiner*—Timothy M. Johnson
*Attorney, Agent, or Firm*—Pennie & Edmonds LLP

[57] ABSTRACT

An apparatus polygonally approximates a contour of an object expressed in a digital video signal. First of all, the apparatus determines a pair of vertices on the contour. Then, a line segment connecting the pair of vertices is generated and widened to thereby produce a band segment. And, a contour segment corresponding to the line segment is detected and, subsequently, the band segment and the contour segment are matched. The band segment is widened to determine a new vertex located between the pair of vertices on the contour until the contour segment is completely covered by the widened band segment. During the band segment widening process, at least one contour pixel on the contour segment, wherein the detected contour pixels, if there are more than one, are last pixels being covered by the widened band segment, are determined and, among the detected contour pixels, a contour pixel, which is closest to a center of a straight line joining the pair of vertices, is determined as the new vertex. Based on the determined vertices, the apparatus recursively performs the above vertex detection process until all vertices on the contour are determined so that the contour is approximated by using the vertices.

15 Claims, 6 Drawing Sheets

POLYGONAL APPROXIMATION METHOD AND APPARATUS FOR USE IN A CONTOUR ENCODING SYSTEM

CROSS REFERENCE TO RELATED APPLICATION

This application is a continuation-in-part of U.S. Ser. No. 08/819,842 filed on Mar. 17, 1997, now abandoned.

FIELD OF THE INVENTION

The present invention relates to a method and apparatus for encoding a video signal; and, more particularly, to a method and apparatus capable of effectively approximating a contour of an object contained in a video signal.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique, wherein an input video image is divided into objects and three sets of parameters for defining the motion, the contour and the pixel data of each object are processed through different encoding channels.

In processing the contour of an object, contour information is important for the analysis and synthesis of the object shape. A classical coding method for representing the contour information is a chain coding method. The chain coding method, however, requires a substantial amount of bits for the representation thereof, although the method does not incur any loss in the contour information.

To overcome the drawback, there have been proposed several methods to encode the contour information. One of the methods is a contour encoding method employing polygonal approximation. In the polygonal approximation, initial vertices of a contour are detected from a multiplicity of contour pixels constituting the contour. That is, if the contour is of an open loop, the two ending points on the contour are determined as the initial vertices, and, if the contour is of a closed loop, the farthest two points on the contour become the initial vertices. After detecting two vertices on the contour, a straight line is drawn between the two vertices and then perpendicular distances from contour pixels on a contour segment connecting the two vertices to the straight line are determined. Among the contour pixels on the contour segment corresponding to the straight line, a contour pixel having a largest perpendicular distance to the straight line is detected as a next vertex if the largest perpendicular distance is greater than a predetermined threshold value. By recursively performing the above process as shown in FIGS. 6A to 6C, a number of vertices on the contour are detected, and vertex information representing the positions of all the vertices on the contour is coded and then provided to a transmitter (not shown) for the transmission thereof.

In a decoder, the contour of the object is reconstructed through the use of polygonal approximation for fitting the contour by lines, wherein each of the lines connects two adjacent vertices by using a plurality of pixels based on the transmitted vertex information. For instance, each of the lines is determined by using a known line generation algorithm, e.g., a Bresenham's algorithm(see Steven Harrington, "Computer Graphics: A Programming Approach", 2nd ed., pp. 17–20).

Since, however, a straight line used in the process of detecting a vertex is different from a corresponding line segment which is reconstructed in the decoder by using a multiplicity of pixels, an unnecessary vertex can be detected by the difference between the straight line and the line segment corresponding to two adjacent vertices; and, consequently, there may occur an increase in the amount of data to be transmitted through the transmitter.

SUMMARY OF THE INVENTION

It is, therefore, a primary object of the invention to provide an improved method and apparatus capable of effectively polygonal-approximating a contour of an object contained in a video signal by using a modified vertex detection technique to thereby reduce the amount of data to be transmitted.

In accordance with one aspect of the present invention, there is provided a method for polygonally approximating a contour of an object expressed in a digital video signal, comprising the steps of: (a) selecting a pair of vertices adjacent to each other on the contour; (b) producing a line segment connecting the pair of vertices by using a multiplicity of pixels; (c) widening each pixel on the line segment by a predetermined threshold value to thereby generate a band segment; (d) detecting a contour segment corresponding to the line segment from the contour; (e) matching the contour segment with the band segment; (f) determining a new vertex located between the pair of vertices on the contour by widening the band segment; and (g) repeating the steps (a) to (f) until all vertices of the contour are detected, thereby providing vertex information representing positions of all vertices on the contour.

In accordance with another aspect of the present invention, there is provided an apparatus for polygonally approximating a contour of an object expressed in a digital video signal, comprising: a block for storing vertex information representing positions of vertices on the contour; a block for selecting a pair of adjacent vertices among the stored vertices based on the vertex information; a block for producing a line segment connecting the pair of adjacent vertices by using a multiplicity of pixels; a block for generating a band segment by widening each pixel on the line segment by a predetermined threshold value; a block for detecting a contour segment corresponding to the line segment from the contour; a block for matching the contour segment with the band segment; and a block for determining a new vertex located between the pair of vertices on the contour by widening the band segment based on the matched segments and providing new vertex information representing the new vertex to the storing block.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
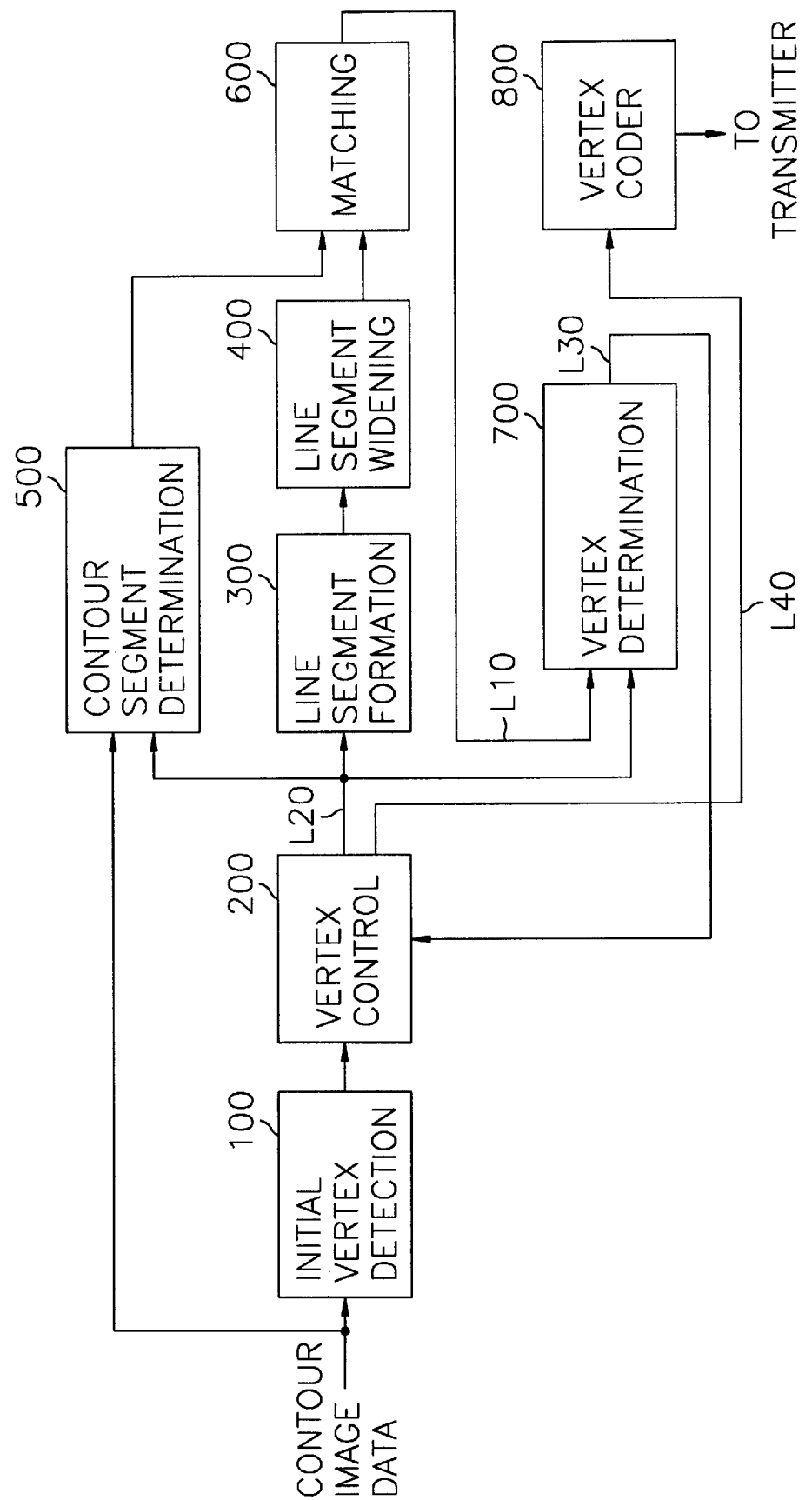
FIG. 1 depicts a schematic block diagram of an apparatus for encoding contour image data in accordance with the present invention.

Referring to FIG. 1, there is shown a schematic block diagram of an apparatus for encoding contour image data inputted in accordance with the present invention, the contour image data representing positions of contour pixels constituting a contour of an object expressed in a video signal. The contour image data is provided to an initial vertex detection block 100 and a contour segment determination block 500.

Figure 6A:
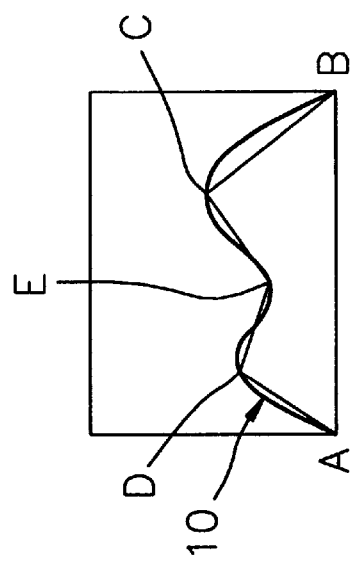
FIGS. 6A to 6C illustrate an exemplary polygonal approximation process of a contour of an object.

The initial vertex detection block 100 finds two initial vertices of the contour based on the contour image data coupled thereto. If the contour image is of an open loop, two end points, e.g., A and B as shown in FIG. 6A, are selected as the two initial vertices. On the other hand, if the contour image is in the form of a closed loop, two farthest points on the contour are chosen as the two initial vertices. Once the two initial vertices are determined, initial vertex information representing the positions of the two initial vertices is fed to a vertex control block 200.

The vertex control block 200 stores vertex information coupled thereto, wherein the vertex information represents the positions of detected vertices on the contour; selects a pair of adjacent vertices disposed adjacent to each other along the contour among the detected vertices including the two initial vertices based on the vertex information; and transfers the vertex information for the pair of adjacent vertices selected above to the contour segment determination block 500, a line segment formation block 300 and a vertex determination block 700 via a line L20.

The line segment formation block 300 generates a line segment connecting the pair of adjacent vertices selected at the vertex control block 200 by using a multiplicity of pixels according to a known line generation algorithm, e.g., a Bresenham's algorithm, based on the vertex information coupled from the vertex control block 200. The line segment is fed to a line segment widening block 400.

The line segment widening block 400 produces a band segment formed along the line segment derived at the line segment formation block 300, wherein the band segment includes a widened pixel region surrounding each pixel on the line segment, the widened pixel region being determined by performing a widening process using a predetermined threshold value TH1. The widening process is accomplished along the line segment by forming a region including neighboring pixels satisfying the following equation for each pixel on the line segment.

$$|x_n - x_s| + |y_n - y_s| \leq TH1 \qquad \text{EQ. 1}$$

wherein $x_s$ and $y_s$ are x and y coordinates of a target pixel on the line segment, respectively; $x_n$ and $y_n$ represent x and y coordinates of each pixel neighboring to the line segment, respectively; and TH1 is the predetermined threshold value.

Figure 3A:
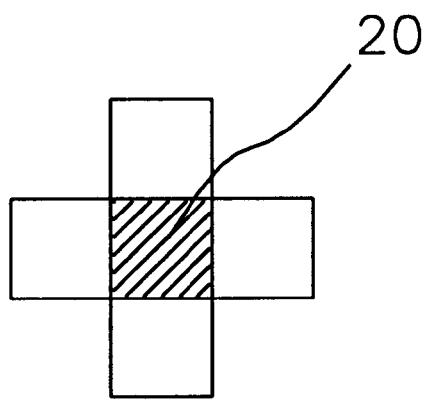
FIGS. 3A and 3B show widened pixels in accordance with the present invention.
Figure 3B:
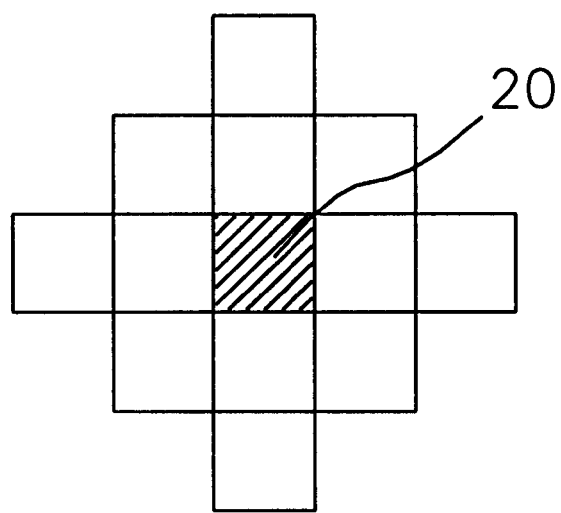

Referring to FIGS. 3A and 3B, there are shown widened pixel regions surrounding a target pixel 20 in accordance with the preferred embodiments of the present invention. If the predetermined threshold value TH1 is 1, the widening process for the target pixel 20 results in a widened pixel region as shown in FIG. 3A. Meanwhile, FIG. 3B displays a widened target pixel region when the predetermined threshold value TH1 is 2.

Conclusively, the band segment along the line segment is formed by neighboring pixels of the line segment satisfying EQ. 1 and target pixels constituting the line segment. The band segment derived at the line segment widening block 400 is coupled to a matching block 600.

In the meantime, the contour segment determination block 500 detects a contour segment corresponding to the line segment produced at the line segment formation block 300 based on the contour image data fed thereto and the vertex information inputted via the line L20 from the vertex control block 200, and delivers the contour segment to the matching block 600.

Figure 4:
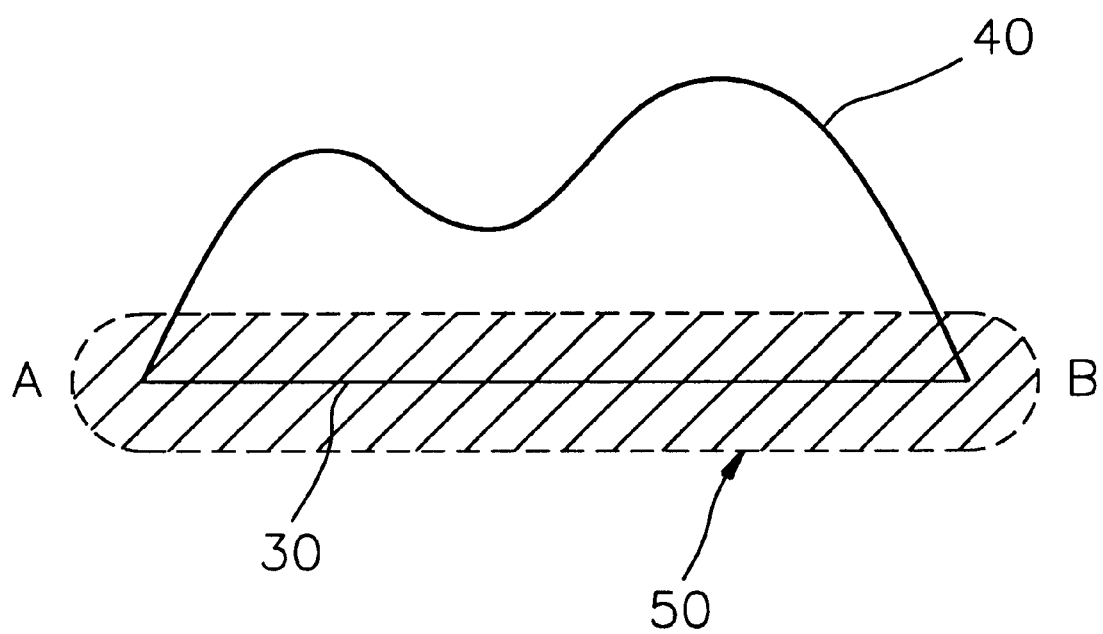
FIG. 4 represents a matching process of a contour and a band segments for two adjacent vertices.

At the matching block 600, the contour segment from the contour segment determination block 500 and the band segment from the line segment widening block 400 are matched with each other. That is, as exemplarily shown in FIG. 4, the band segment 50 corresponding to the line segment 30 is matched with the contour segment 40 based on the pair of adjacent vertices, e.g., A and B. Subsequently, the matching block 600 provides matching information representing the matched segments 40 and 50 to the vertex determination block 700 via a line L10.

Based on the vertex information coupled from the vertex control block 200 via the line L20 and the matching information provided from the matching block 600 via the line L10, the vertex determination block 700 detects a new vertex positioned between the pair of adjacent vertices corresponding to the vertex information.

Figure 2:
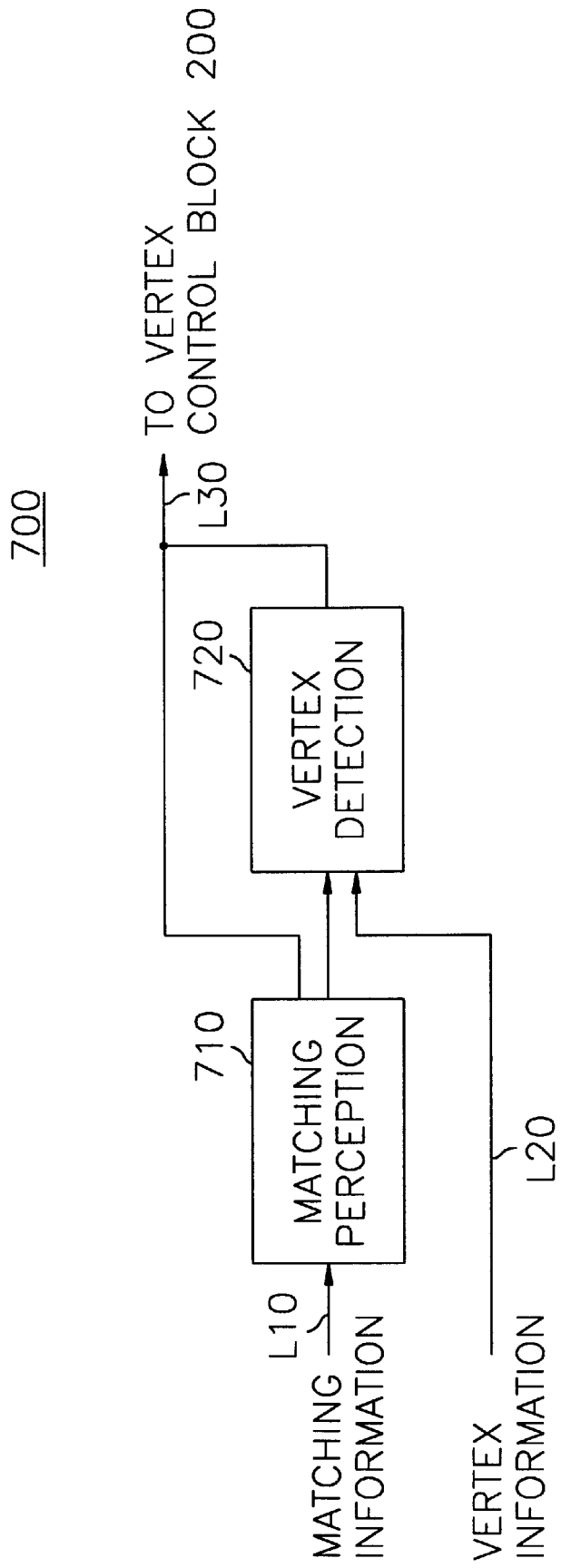
FIG. 2 provides a detailed block diagram of the vertex determination block 700 shown in FIG. 1.

Referring to FIG. 2, there is provided a detailed block diagram of the vertex determination block 700 shown in FIG. 1 which includes a matching perception sector 710 and a vertex detection sector 720.

The matching perception sector 710 checks whether the contour segment is entirely covered by its corresponding band segment by examining the matching information coupled thereto via the line L10. As a result of the checking process, if the contour segment is fully covered by the band segment, the matching perception sector 710 produces a matching signal to the vertex control block 200 via a line L30. If otherwise, the matching perception sector 710 directly transfers the matching information to the vertex detection sector 720.

If the matching information is inputted thereto, the vertex detection sector 720 first calculates a slope of a straight line connecting the pair of adjacent vertices corresponding to the vertex information coupled thereto via the line L20.

Figure 5:
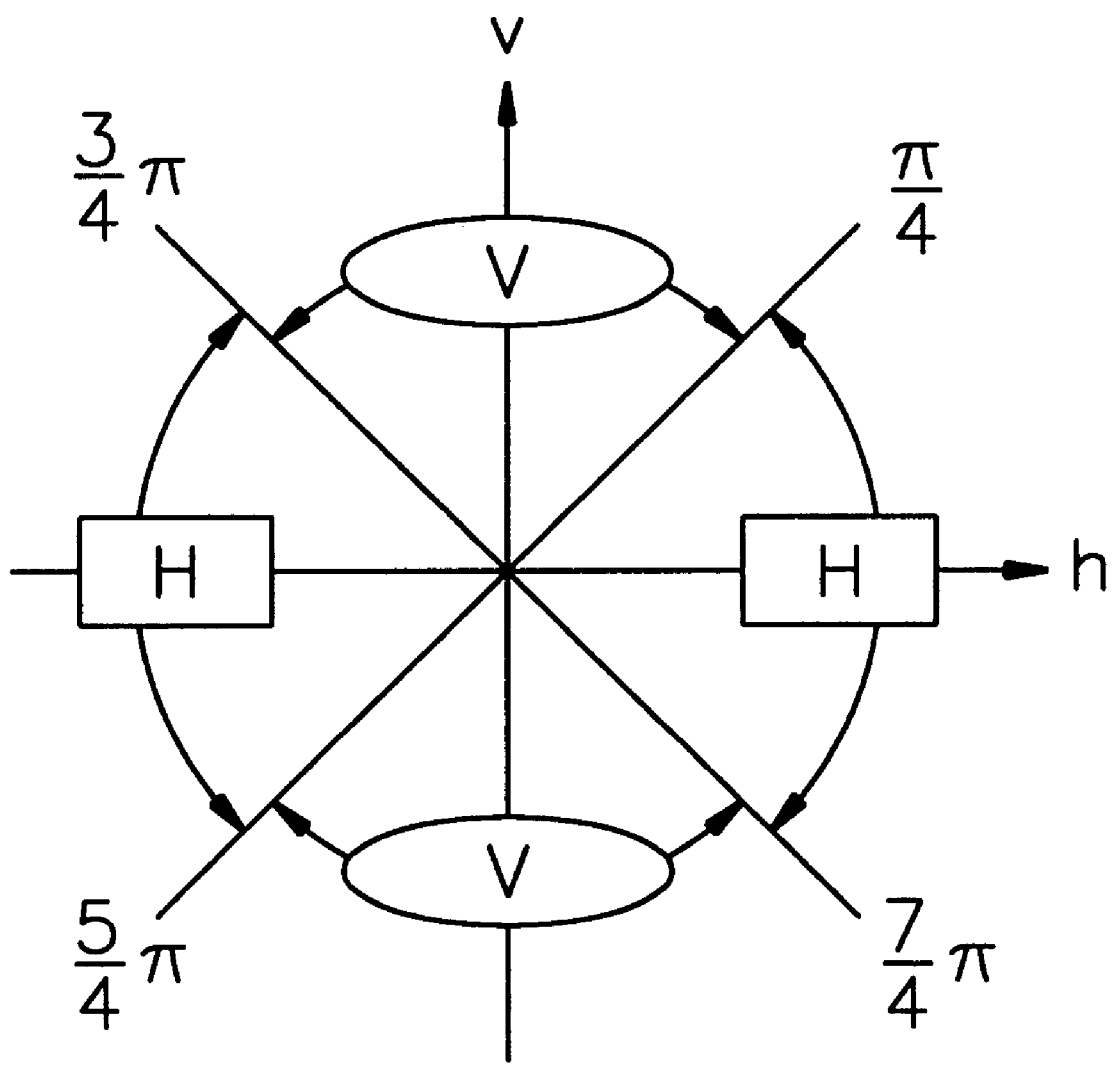
FIG. 5 shows slope regions determining a direction of a pixel widening.

Then, the vertex detection sector 720 detects to which slope region between a vertical and a horizontal slope regions the calculated slope belongs. For example, referring to FIG. 5, a vertical slope region V represents slopes included between $\pi/4$ and $3\pi/4$ and between $5\pi/4$ and $7\pi/4$. On the other hand, a horizontal slope region H represents slopes excluded from the vertical slope region V in the same plane.

In the above, if the calculated slope belongs to the vertical slope region V, the vertex detection sector 720 horizontally widens the band segment by one pixel until the contour segment is completely covered by the widened band segment. If otherwise, the vertex detection sector 720 vertically widens the band segment by one pixel until the contour segment is completely covered by the widened band segment.

Through the widening process, the vertex detection sector 720 detects at least one contour pixel on the contour segment, wherein the detected contour pixels, if there are more than one, are last pixels being covered by the widened band segment; determines a contour pixel, which is closest to a center of a straight line joining the pair of adjacent vertices, among the detected contour pixels as a new vertex; and provides new vertex information representing the position of the new vertex to the vertex control block 200 via the line L30.

For instance, referring to FIG. 6A, the point C is determined as the new vertex positioned between the pair of adjacent vertices A and B and its vertex information is transferred to the vertex control block 200.

As stated above, if the matching signal or the new vertex information is coupled thereto, the vertex control block 200 stores the new vertex information and provides a new pair of adjacent vertices to next blocks 300, 500, and 700. In the second procedure, the vertices A and C are selected as the new pair of adjacent vertices and their vertex information is supplied to the above next blocks. The blocks 300, 400, 500, 600, and 700 respectively perform their functions as described in the above processes for the vertex information retrieved from the vertex control block 200. As a result of the above processes, if a vertex D is determined as a new vertex between vertices A and C, the same processes are repeated for two vertices A and D.

Figure 6B:
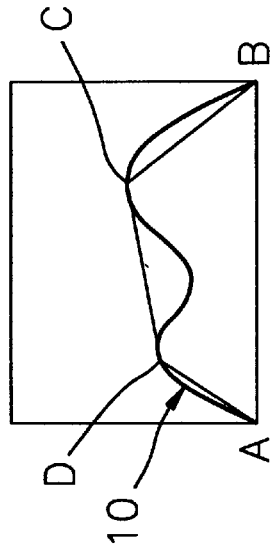
Figure 6C:
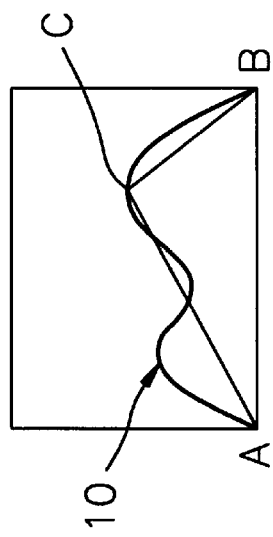

On the other hand, if it is recognized that a contour segment is entirely covered by its corresponding widened band segment at the matching perception sector 710 in the vertex determination block 700, i.e., a widened band segment for two vertices, e.g., A and D, outputted from the vertex control block 200, completely covers a corresponding contour segment, the vertex determination block 700 will detect no more new vertex and, as aforementioned, a matching signal is provided to the vertex control block 200 instead of new vertex information. In that case, if the matching signal is received, the vertex control block 200 supplies a new pair of adjacent vertices, namely, D and C to the next processing blocks. This vertex detection procedure is repeated until all vertices, e.g., A to E, for the contour 10 are detected as shown in FIGS. 6A to 6C.

The number of vertices varies depending on the predetermined threshold value TH1. As can be seen from FIGS. 6A to 6C, the approximation to the contour 10 by line segments becomes more accurate as the predetermined threshold value TH1 becomes smaller, at the expense of coding efficiency.

Referring back to FIG. 1, once all vertices are determined for the contour 10 through the use of the vertex detection procedure, vertex information representing the positions of all the detected vertices, e.g., A to E, on the contour 10 is temporarily stored at the vertex control block 200 and then provided to the vertex coder 800 via a line L40.

The vertex coder 800 encodes the vertex information derived from the vertex control block 200 by using, e.g., a conventional syntax arithmetic code or the binary arithmetic code, and provides the coded vertex information to a transmitter(not shown) for the transmission thereof.

In the above, the vertex detection procedure starts from the initial vertex A and proceeds in clockwise direction, but the final result does not depend on the proceeding sequence as long as all the pairs of adjacent vertices are covered.

Furthermore, in the above embodiment, although a band segment is produced by widening a corresponding line segment based on EQ. 1, the band segment can be generated by widening the line segment by the predetermined threshold value TH1 through the use of the widening method based on a slope of a straight line connecting two adjacent vertices as performed at the vertex detection sector 720 in the vertex determination block 700.

The above vertex detection technique in accordance with the present invention can be adopted to contour image encoding methods based on vertices on a contour.

While the present invention has been described with respect to the particular embodiments, it will be apparent to those skilled in the art that various changes and modifications may be made without departing from the spirit and scope of the invention as defined in the following claims.

What is claimed is:

1. A method for polygonally approximating a contour of an object expressed in a digital video signal, comprising the steps of:

(a) selecting a pair of vertices on the contour;

(b) producing a line segment connecting the pair of vertices by using a multiplicity of pixels;

(c) widening each pixel on the line segment by a predetermined threshold value to thereby generate a band segment;

(d) detecting a contour segment corresponding to the line segment from the contour;

(e) matching the contour segment with the band segment;

(f) determining a new vertex located between the pair of vertices on the contour by widening the band segment; and (g) repeating the steps (a) to (f) until all vertices of the contour are detected, thereby providing vertex information representing positions of all vertices on the contour, wherein the step (f) includes the steps of:

(f1) checking whether the contour segment is entirely covered by the band segment based on the matched segments produced at the step (e);

(f2) if the contour segment is not completely covered by the band segment, widening the band segment until the contour segment is completely covered by the widened band segment;

(f3) detecting at least one contour pixel on the contour segment, wherein the detected contour pixels if there are more than ones are last pixels being covered by the widened band segment; and (f4) determining one of the detected contour pixels as the new vertex, wherein the step (f2) contains the steps of:

(f21) calculating a slope of a straight line connecting the pair of vertices;

(f22) detecting to which slope region between a vertical and a horizontal slope regions the calculated slope belongs; and (f23) in response to the detecting result of the step (f22), vertically or horizontally widening the band segment until the contour segment is completely covered by the widened band segment.

2. The method as recited in claim 1, wherein the step (f4) determines a contour pixel, which is closest to a center of a straight line joining the pair of vertices, among the detected contour pixels as the new vertex.

3. The method as recited in claim 1, wherein if the calculated slope belongs to the vertical slope regions, the band segment is horizontally widened while it is vertically widened if otherwise.

4. The method as recited in claim 3, wherein the vertical slope region represents slopes included between $\pi/4$ and 3

π/4 and between 5 π/4 and 7 π/4, and the horizontal slope region represents slopes excluded from the vertical slope region.

5. The method as recited in claim 4, wherein the line segment is produced by using a Bresenham's algorithm.

6. The method as recited in claim 5, wherein the band segment includes neighboring pixels satisfying the following equation for each pixel on the line segment, $$|x_n-x_s|+|y_n-y_s| \leq TH1$$

wherein $x_s$ and $y_s$ are x and y coordinates of a target pixel on the line segment, respectively; $x_n$ and $y_n$ represent x and y coordinates of a pixel neighboring to the line segment, respectively; and TH1 is the predetermined threshold value.

7. The method as recited in claim 5, wherein the step (c) includes the steps of:
   (c1) calculating a slope of a straight line connecting the pair of vertices; and
   (c2) generating the band segment by vertically or horizontally widening each pixel on the line segment depending on the calculated slope.

8. An apparatus for polygonally approximating a contour of an object expressed in a digital video signal, comprising:
   means for storing vertex information representing positions of vertices on the contour;
   means for selecting a pair of vertices among the stored vertices based on the vertex information;
   means for producing a line segment connecting the pair of vertices by using a multiplicity of pixels;
   means for generating a band segment by widening each pixel on the line segment by a predetermined threshold value;
   means for detecting a contour segment corresponding to the line segment from the contour;
   means for matching the contour segment with the band segment; and
   means for determining a new vertex located between the pair of vertices on the contour by widening the band segment based on the matched segments and providing new vertex information representing the new vertex to the storing means,
   wherein the new vertex determining means includes:
      means for widening the band segment until the contour segment is completely covered by the widened band segment;
      means for detecting at least one contour pixel on the contour segment wherein the detected contour pixels if there are more than one, are last pixels being covered by the widened band segment; and
      means for determining one of the detected contour pixels as the new vertex to thereby provide the new vertex information,
   wherein the band segment widening means contains:
      means for calculating a slope of a straight line connecting the pair of vertices;
      means for detecting to which slope region between a vertical and a horizontal slope regions the calculated slope belongs; and
      means for, in response to the above detecting result, vertically or horizontally widening the band segment until the contour segment is completely covered by the widened band segment.

9. The apparatus according to claim 8, wherein a contour pixel, which is closest to a center of a straight line joining the pair of vertices, among the detected contour pixels is determined as the new vertex. segment.

10. The apparatus according to claim 8, wherein if the calculated slope belongs to the vertical slope regions, the band segment is horizontally widened while it is vertically widened if otherwise.

11. The apparatus according to claim 10, wherein the vertical slope region represents slopes included between π/4 and 3 π/4 and between 5 π/4 and 7 π/4, and the horizontal slope region represents slopes excluded from the vertical slope region.

12. The apparatus according to claim 11, wherein the line segment is produced by using a Bresenham's algorithm.

13. The apparatus according to claim 12, wherein the band segment includes neighboring pixels satisfying the following equation for each pixel on the line segment, $$|x_n-x_s|+|y_n-y_s| \leq TH1$$

wherein $x_s$ and $y_s$ are x and y coordinates of a target pixel on the line segment, respectively; $x_n$ and $y_n$ represent x and y coordinates of a pixel neighboring to the line segment, respectively; and TH1 is the predetermined threshold value.

14. The apparatus according to claim 13, wherein the band segment generating means includes:
   means for calculating a slope of a straight line connecting the pair of vertices; and
   means for generating the band segment by vertically or horizontally widening each pixel on the line segment depending on the calculated slope.

15. A method for polyjonally approximating a contour of an object expressed in a digital video signal comprising the steps of:
   (a) selecting a pair of vertices on the contour;
   (b) producing a line segment connecting the Pair of vertices by using a multiplicity of pixels;
   (c) widening each pixel on the line segment by a predetermined threshold value to thereby generate a band segment, a first number of pixels on the contour being outside said band segment;
   (d) determining a new vertex located between the pair of vertices on the contour by widening the band segment in one of a horizontal direction and a vertical direction, based on a slope of the line segment said new vertex being selected from among said first number of pixels on the contour and being the last pixel to be encompassed as the band segment is widened; and
   (e) repeating the steps (a) to (d) until all vertices of the contour are detected, thereby providing vertex information representing positions of all vertices on the contour, wherein the band segment includes neighboring pixels satisfying the following equation for each pixel on the line segment:

$$|x_n-x_s|+|y_n-y_s| \leq TH1$$

wherein $x_s$ and $y_s$ are x and y coordinates of a target pixel on the line segment, respectively; $x_n$ and $y_n$ represent x and y coordinates of a pixel neighboring to the line segment, respectively, and TH1 is the predetermined threshold value.

* * * * *